Dec. 29, 1931.   C. T. HATCH   1,838,395
BAKING OVEN
Filed Sept. 2, 1930   3 Sheets-Sheet 1

INVENTOR
Charles T. Hatch
BY
Chappell & Earl
ATTORNEYS

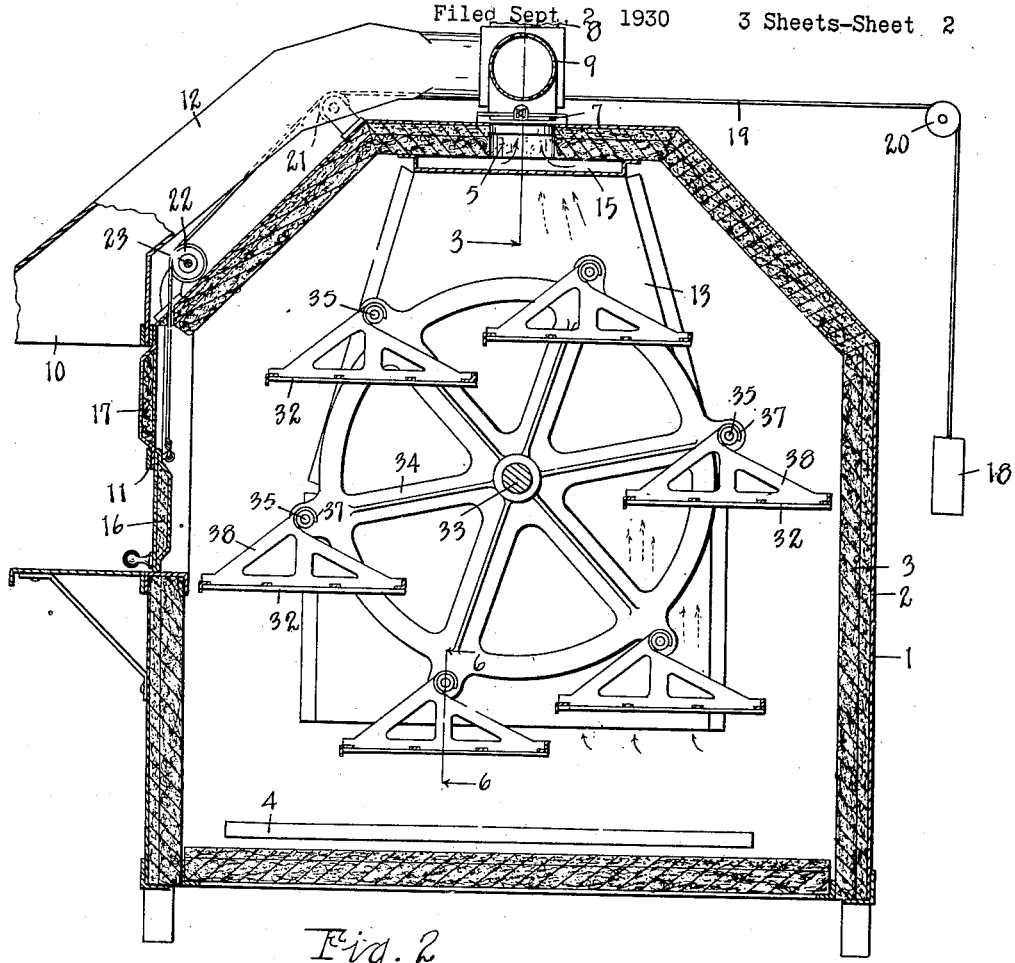

Dec. 29, 1931. C. T. HATCH 1,838,395
BAKING OVEN
Filed Sept. 2, 1930 3 Sheets-Sheet 3
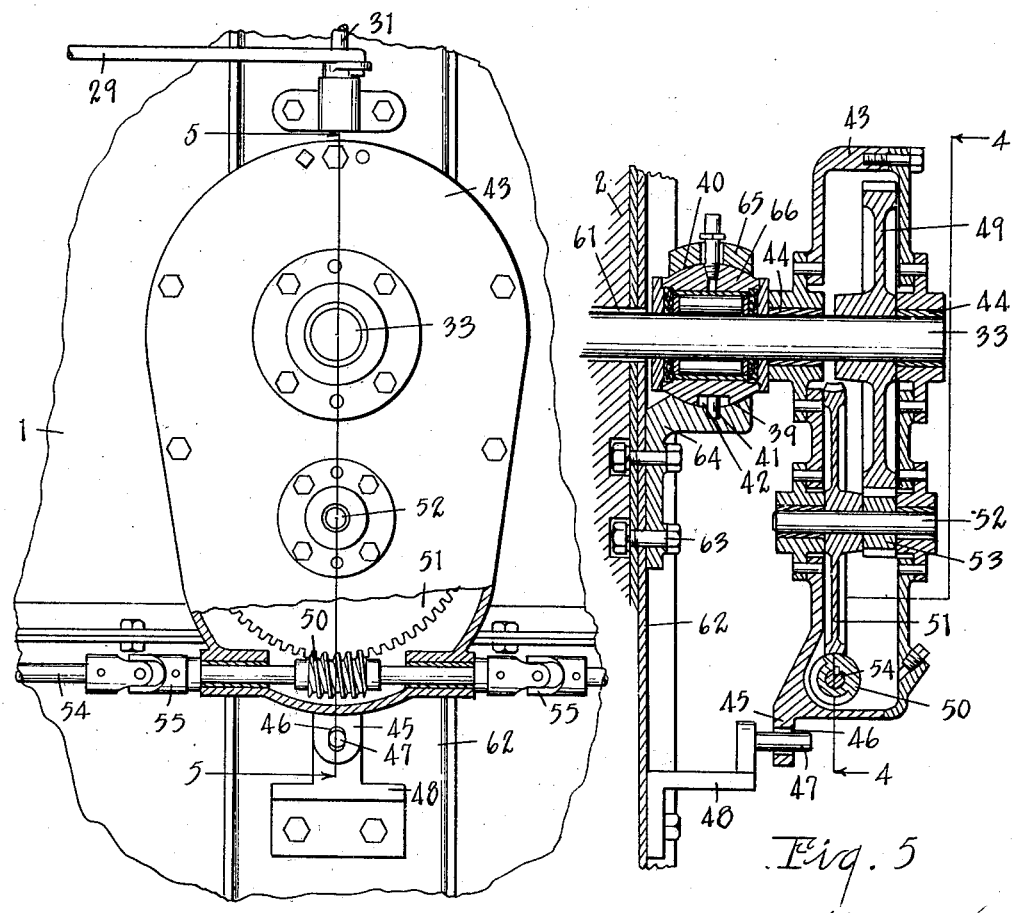
Fig. 4
Fig. 5
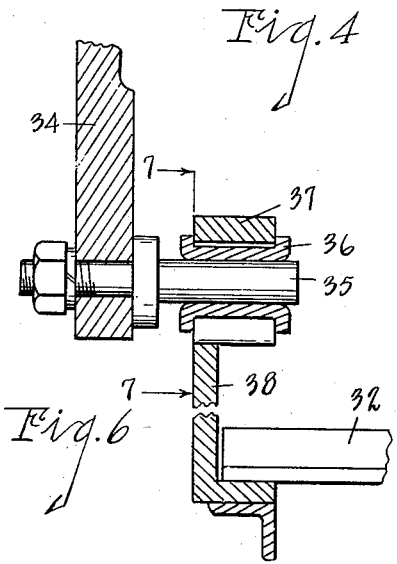
Fig. 6
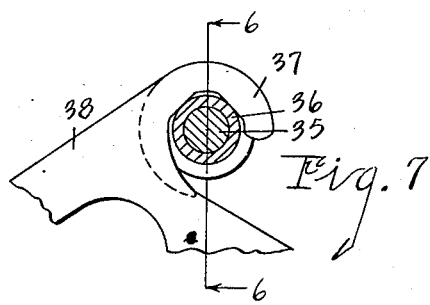
Fig. 7
INVENTOR
Charles T. Hatch
BY Chappell Earl
ATTORNEYS Patented Dec. 29, 1931

1,838,395

UNITED STATES PATENT OFFICE

CHARLES T. HATCH, OF ALBION, MICHIGAN, ASSIGNOR TO UNION STEEL PRODUCTS COMPANY, OF ALBION, MICHIGAN

BAKING OVEN

Application filed September 2, 1930. Serial No. 479,167.

The main objects of this invention are:

First, to provide a baking oven of the rotary rack type in which the racks are supported so that they may be readily removed and replaced as occasion requires, and at the same time the structure is strong and durable.

Second, to provide in a baking oven improved reel supporting and driving means which is not affected by the buckling and warping of the oven walls commonly incident to the heating and cooling thereof.

Third, to provide in a baking oven an improved venting means which, while effectively venting the oven, insures a uniform distribution of the heat.

Fourth, to provide in a baking oven an improved door supporting and operating means.

Objects pertaining to details and economies of my invention will definitely appear from the description to follow. The invention is defined in the claims.

A structure embodying the features of my invention is clearly illustrated in the accompanying drawings, in which:

Fig. 2 is a fragmentary view mainly in vertical section on a line corresponding to the broken line 2—2 of Fig. 3.

Fig. 3 is a fragmentary view mainly in vertical section on line 3—3 of Fig. 2.

Fig. 4 is a fragmentary view partially in elevation and partially in section on broken line 4—4 of Fig. 5.

Fig. 5 is a fragmentary view mainly in section on line 5—5 of Figs. 1 and 4.

Fig. 6 is an enlarged detail of the rack supporting means partially in section on line 6—6 of Fig. 7.

Fig. 7 is a detail section on line 7—7 of Fig. 6.

Figure 1:
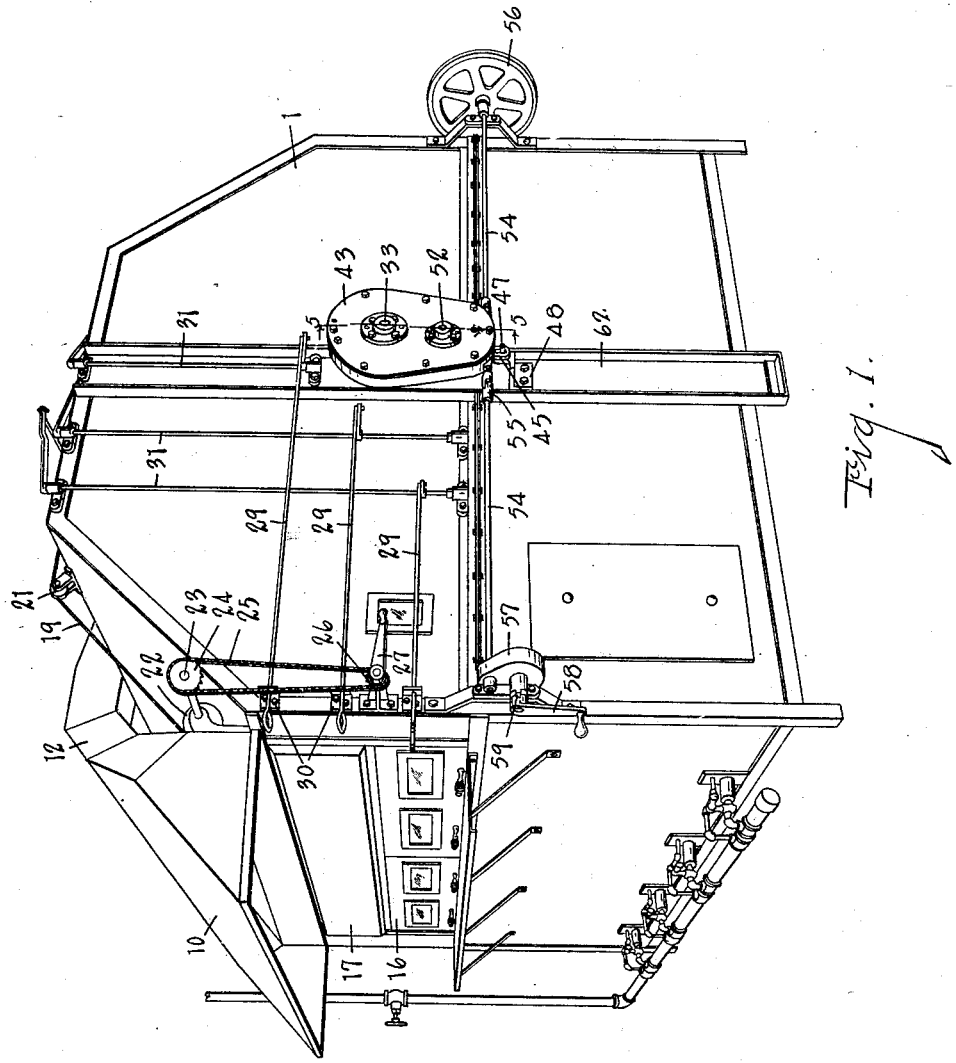
Fig. 1 is a front perspective view of my oven.

Referring to the drawings, the walls of the housing 1 are built up of an outer sheet metal shell 2 with insulating material 3 arranged on the inner side thereof. The burners 4 are indicated conventionally in Fig. 2. The oven housing is provided with a central vent opening 5 and end vent openings 6. The vent opening 5 is directly below the stack 8 while the openings 6 are connected directly to the stack by the pipes 9.

The hood 10 is arranged above the door opening 11 and connected to the stack by means of the pipe 12.

Flat ventilating flues 13 are mounted on the inner side of the end walls 14 of the oven to open adjacent the bottom of the oven. These flues are of considerable width at their lower ends, their upper portions tapering upwardly to the horizontal flues 15 on the top of the oven opening to the vent openings 6.

The door 16 is mounted to slide vertically at the rear of the insulated panel 17. The door is in sections and each section is provided with a counterweight 18 carried by the cable 19. The cable is arranged over the guide pulleys 20 and 21 and wrapped around the pulley 22 on the shaft 23 so that by rotating the shaft the door is raised and lowered, the counterweight counterbalancing the door so that this operation is rendered quite easy.

The shaft 23 is provided with a sprocket wheel 24 connected by the sprocket chain 25 to the sprocket 26 on the crank 27 mounted at one end of the oven for convenient manipulation.

The vent opening 5 is provided with a slide damper 7 while the vent openings 6 are provided with similar dampers 28. These dampers are connected to the operating rods 29 which are slidably mounted in the brackets 30 through rock-shafts and link mechanisms designated generally by the numeral 31, see Fig. 1. By these mechanisms each damper may be independently operated and the operating means are all conveniently grouped for manipulation from the front of the oven.

The oven racks 32 are mounted on a supporting reel consisting of the shaft 33 and the wheel-like heads 34 mounted on the shaft. These heads 34 are provided with inwardly projecting spindles 35 arranged in opposed pairs. The spindles have flanged bearings 36 thereon with which the downwardly facing hooks 37 of the rack hangers or supports 38 are engaged. These bearings are of suitable bearing material, the hooks engaging the bearings so that the wear on the spindles is minimized. Direct engagement of the hooks with the spindles would soon score and destroy them.

The shaft 33 projects through the end walls of the housing, these walls having openings 61 therein of such diameter that the walls are out of contact with the shafts. Supporting means are illustrated for only one end of the shaft; the other, it will be understood, is a duplicate.

On the outside of the end wall I arrange a supporting upright 62 of such length as to rest upon the floor or foundation for the oven. The upright is secured to the wall by bolts 63 which, however, are not designed particularly to carry the load but merely to properly position the uprights.

These uprights are provided with a bearing bracket 64 having a bearing box 65 thereon. The bearing 66 for the shaft is mounted in this bearing box. The box and the bearing have coacting spherically curved surfaces 39 and 40 which permit axial tilting movement of the bearing in its box. The pin 41 on the box engages a slot 42 in the bearing, preventing rotation of the bearing while permitting this tilting or axial movement.

This arrangement of parts results in a structure in which the buckling or warping of the walls of the oven does not affect the bearing or distort the shaft.

The rack is provided with a driving means comprising a transmission arranged in the gear box or housing 43 which is provided with bearings 44 engaging the shaft so that the transmission is supported directly on the shaft. To prevent rotation of the gear box on the shaft the box is provided with an ear 45 having a hole 46 therein engaged by the pin 47 carried by the bracket 48 on the upright 35. The hole 46 is vertically elongated so that movement of the shaft does not place any stress on the gear housing.

The transmission comprises a gear 49 on the shaft 33, a driving worm 50 coacting with a gear 51 on the shaft 52. A gear 53 affixed to this shaft coacts with the gear 49. The driving shaft 54 is connected to the worm through the universal joints 55.

The shaft is provided with a pulley 56 at one end and connected by a gearing arranged within the housing 57 to the crank 58. This crank is provided with a jaw clutch 59 permitting its engagement with the gear within the housing which is not illustrated.

With this arrangement of parts the rack supporting reel may be continuously driven, the driving means not being here illustrated, during the baking operation and then manipulated by hand to properly present the racks for unloading and loading.

Ovens embodying my improvements have the advantage of quite uniform temperatures throughout the oven but the reel may be driven during the baking operations to secure complete uniformity in baking. Further, the reel may be very easily manipulated for loading and unloading purposes.

The mounting for the reel shaft and driving means is such that it is not affected by the buckling and warping of the walls of the oven such as is likely to occur from the heating and cooling thereof, especially in ovens of considerable size.

By the arrangement of the flues and dampers of this application, the temperature of the oven from top to bottom and also from end to end may be very effectively controlled. By proper operation and adjustment of the side dampers, when the center damper is closed, the heat is regulated from end to end of the oven and by properly regulating these dampers relative to the top damper it is possible to very accurately control the amount and direction of air circulation in the oven.

I have not attempted to illustrate certain other embodiments and adaptations of my invention which I contemplate as it is believed that this disclosure will enable those skilled in the art to embody or adapt the same as may be desired.

Having thus described my invention what I claim as new and desire to secure by Letters Patent is:

1. In an oven, the combination of a rack supporting reel provided with a shaft projecting from said oven, a supporting upright mounted at one end of said oven, a bearing for said shaft mounted on said upright, said shaft projecting beyond said bearing, a gear box having supporting bearings on said shaft, said gear box being provided with a perforated ear, a pin mounted on said upright to engage said perforated ear for supporting said gear box in upright position on said shaft, a driving worm within said gear box provided with a driving shaft, a coacting driven worm provided with a pinion, and a gear on said shaft meshing with said pinion.

2. In an oven, the combination of a rack supporting reel provided with a shaft projecting from said oven, a supporting upright mounted at one end of said oven, a bearing for said shaft mounted on said upright, said shaft projecting beyond said bearing, a gear box having supporting bearings on said shaft, a driving worm within said gear box provided with a driving shaft, a coacting driven worm provided with a pinion, and a gear on said shaft meshing with said pinion.

3. In an oven, the combination of a rack supporting reel provided with a shaft projecting through a wall of the oven, a bearing support mounted at the outside of the wall of the oven through which the shaft projects, a bearing for said shaft mounted on said support, the shaft being out of contact with the wall of the oven, the bearing and its support having spherically curved surfaces permitting axial rocking movement of the bearing, a gear box mounted on the outer end of said shaft, and a train of driving gears housed within said box and including a gear on said shaft.

4. In an oven, the combination of a rack supporting reel provided with a shaft projecting through a wall of the oven, a bearing support mounted at the outside of the wall of the oven through which the shaft projects, a bearing for said shaft mounted on said support, the shaft being out of contact with the wall of the oven, a gear box mounted on the outer end of said shaft, and a train of driving gears housed within said box and including a gear on said shaft.

5. In an oven, the combination of a rack supporting reel provided with a shaft projecting through a wall of the oven, a bearing support mounted at the outside of the wall of the oven through which the shaft projects, and a bearing for said shaft mounted on said support, the shaft being out of contact with the wall of the oven, the bearing and its support having spherically curved surfaces permitting axial rocking movement of the bearing.

6. In an oven, the combination of a rack supporting reel provided with a shaft projecting from said oven, a bearing for said shaft on the outside of said oven, a support for said bearing disposed at the outside of said oven, and a driving means including a transmission provided with a housing supported by bearings on said shaft.

7. In an oven, the combination of a rack supporting reel provided with a shaft projecting from said oven, a bearing for said shaft on the outside of said oven, and a driving means including a transmission provided with a housing supported by bearings on said shaft.

8. In an oven having burners arranged at the bottom thereof, a centrally disposed top vent, end vents in the top disposed adjacent the ends of the oven, flattened vent flues at the ends of the oven opening adjacent the bottom thereof and communicating with said end vents, and independent dampers for said vent openings.

In witness whereof I have hereunto set my hand.

CHARLES T. HATCH.